(12) United States Patent
Sawai (10) Patent No.: US 7,784,950 B2
(45) Date of Patent: Aug. 31, 2010

(54) IMAGE PROJECTING APPARATUS HAVING VARIABLE STOP

(75) Inventor: Yasumasa Sawai, Yamatotakada (JP)

(73) Assignee: Konica Minolta Opto, Inc., Hachioji-shi (JP)

( * ) Notice: Subject to any disclaimer, the term of this patent is extended or adjusted under 35 U.S.C. 154(b) by 938 days.

(21) Appl. No.: 11/517,100

(22) Filed: Sep. 7, 2006

(65) Prior Publication Data

US 2007/0064203 A1    Mar. 22, 2007

(30) Foreign Application Priority Data

Sep. 21, 2005   (JP)  ............................. 2005-273814

(51) Int. Cl.
*G03B 21/14* (2006.01)
(52) U.S. Cl. .............................. 353/97; 353/75; 353/76; 353/77; 353/98; 353/99; 396/120; 396/220; 396/242; 396/483; 396/484; 396/491; 396/493; 396/505; 396/508; 396/510; 348/246; 348/296; 348/363

(58) Field of Classification Search ................. 396/120, 396/220, 242, 483, 484, 491, 493, 505, 508, 396/510; 353/75, 76, 77, 78, 97, 98, 99; 348/246, 296, 363
See application file for complete search history.

(56) References Cited

U.S. PATENT DOCUMENTS

| 5,924,783 A | 7/1999 | Jones ........................... 353/97 |
| 6,089,720 A | 7/2000 | Sawai ........................... 353/98 |
| 6,648,476 B2 | 11/2003 | Watanabe et al. ............. 353/97 |
| 6,923,546 B2 | 8/2005 | Kurematsu ................... 353/97 |
| 2003/0161626 A1* | 8/2003 | Namazue et al. ............. 396/505 |
| 2005/0001997 A1* | 1/2005 | Kawaai et al. ................ 353/97 |

* cited by examiner

*Primary Examiner*—Georgia Y Epps
*Assistant Examiner*—Sultan Chowdhury
(74) *Attorney, Agent, or Firm*—Sidley Austin LLP (57) ABSTRACT

An image projecting apparatus has an integrator for generating plural secondary-light-source images for generating illumination light with a uniform intensity; and a variable stop mechanism arranged at or near a position conjugate with the secondary-light-source images. The variable stop mechanism has a base plate having a fixed aperture; and a stop blade which moves across the aperture for changing a quantity of light. The change in the quantity of light passing through said variable stop caused by the movement of said stop blade is greater than a change in a size of an effective region of a stop aperture.

21 Claims, 9 Drawing Sheets

IMAGE PROJECTING APPARATUS HAVING VARIABLE STOP

This application is based on the application No. 2005-273814 filed in Japan Sep. 21, 2005, the entire content of which is hereby incorporated by reference.

BACKGROUND OF THE INVENTION

1. Field of the Invention

The present invention relates to an image projecting apparatus having a variable stop and, for example, relates to an image projecting apparatus having a variable stop for dynamically changing quantity of projected light according to brightness of displayed images.

2. Description of the Related Art

U.S. Pat. No. 6,648,476 B2 ('476) suggests an image projecting apparatus for projecting an image on a display device onto a screen surface in an enlarged manner, wherein the image projecting apparatus changes the quantity of projected light through a variable stop. The image projecting apparatus adjusts a size of an effective diameter of light bundles through the variable stop for switching an image mode according to brightness and darkness of an ambient environment. This enables increasing a contrast even when the image to be projected has a lower brightness.

The image projecting apparatus suggested in '476 includes a rod integrator for uniformly illuminating an image display surface of the display device. An integrator such as the rod integrator, a lens array or the like generates plural secondary-light-source images, and light ray bundles from the plural secondary-light-source images are superimposed on one another to realize illumination with a uniform illuminance distribution. However, if aperture setting (stopping down an aperture) is performed through the variable stop, some of the plural secondary-light-source images are intercepted, thus reducing the number of secondary-light-source images passing through the variable stop due to the aperture setting. This will degrade uniform illumination effect of the integrator. Furthermore, if the aperture setting is performed through the variable stop, the F number of a projection system increases to increase a depth of focus, thereby causing dusts and the like adhered to other optical components (for example, a cover glass of the display device) near a surface conjugate with the screen to be conspicuous on a projection screen. '476 does neither recognize existence of the aforementioned problems and nor provide a countermeasure thereagainst.

SUMMARY OF THE INVENTION

It is an object of the present invention to provide an image projecting apparatus capable of causing a variable stop to effectively function while maintaining a uniform illumination effect of an integrator.

In order to attain the aforementioned object, an image projecting apparatus according to a first invention includes an integrator for generating plural secondary-light-source images and a variable stop for restricting a quantity of light at or near a position conjugate with the secondary-light-source images, wherein a change in the quantity of light passing through the variable stop is greater than a change in a size of an effective region of a stop aperture from before to after the aperture setting through the variable stop.

Preferably, the stop aperture of the variable stop at least partially has a characteristic of an ND filter.

Preferably, the stop aperture set by the variable stop is formed of plural apertures.

According to the present invention, the change in the quantity of light passing through the variable stop is greater than the change in the size of the effective region of the stop aperture from before to after the aperture setting and, therefore, even if the aperture setting is performed through the variable stop, it is possible to suppress reduction in the number of secondary-light-source images passing through the variable stop due to the aperture setting. As a result, it is possible to maintain the uniform illumination effect of the integrator. Further, it is possible to perform the aperture setting through the variable stop in such a manner as to prevent the F number of the projection system from being increased to increase the depth of focus, which can prevent dusts and the like adhered to the optical components near the surface conjugate with the screen from being conspicuous on the projection screen. This enables the variable stop to effectively function while maintaining the uniform illumination effect of the integrator. For example, by providing a variable stop mechanism for dynamically changing the quantity of projected light according to the brightness of the image to be displayed on the surface of the display device, it is possible to emphasize the brightness and darkness of a picture scene to be displayed to increase the contrast thereof.

BRIEF DESCRIPTION OF THE DRAWINGS

These and other objects, advantages and features of the invention will become apparent from the following description thereof taken in conjunction with the preferred embodiments with the reference to the accompanying drawings in which.

DETAILED DESCRIPTION OF THE PREFERRED EMBODIMENT

Hereinafter, with reference to the drawings, there will be described embodiments and the like of an image projecting apparatus according to the present invention. Same reference signs are designated to same or corresponding portions throughout the respective embodiments and the like, and redundant descriptions thereof will not be repeated.

Figure 1:
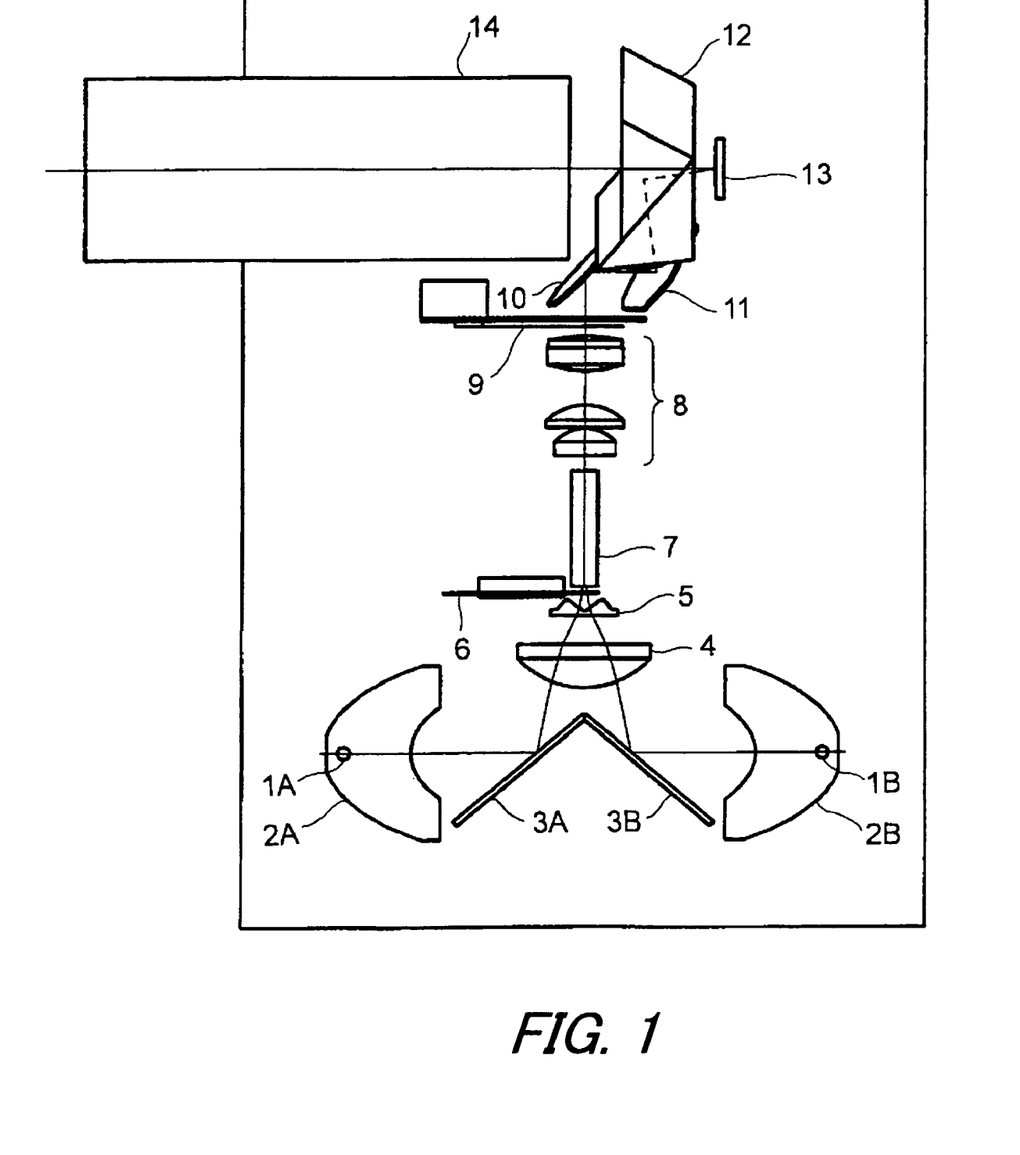
FIG. 1 is a plan view illustrating an embodiment of an image projecting apparatus having a variable stop in an illumination system.

FIG. 1 illustrates a view from above of an embodiment of an image projecting apparatus having a variable stop in an illumination system. In FIG. 1, reference signs 1A and 1B denote light sources, reference signs 2A and 2B denote lamp reflectors, reference signs 3A and 3B denote folding mirrors, reference sign 4 denotes a condenser lens, reference sign 5 denotes a deflection prism, reference sign 6 denotes a color wheel, reference sign 7 denotes a rod integrator, reference sign 8 denotes a relay optical system, reference sign 9 denotes a variable stop mechanism, reference signs 10 and 11 denote mirrors, reference sign 12 denotes a prism unit, reference sign 13 denotes a display device (a light valve or the like), and reference sign 14 denotes a projecting lens. The image projecting apparatus includes two pairs of optical components, from the light sources 1A, 1B to the folding mirrors 3A, 3B, thereby forming a double-light type illumination system capable of lighting only a single light source and of concurrently lighting the two light sources.

The light sources 1A, 1B are constituted by electric-discharge lamps (for example, supper-high pressure mercury-vapor lamps) which generate white light. The lamp reflectors 2A, 2B have an elliptical reflection surface, and the light sources 1A, 1B are placed at focal points thereof. Namely, the lamp reflectors 2A, 2B are elliptical surface mirrors (condensing optical systems) for condensing lights generated from the light sources 1A, 1B to form secondary light sources. Light ray bundles from the light sources 1A, 1B are reflected by the lamp reflectors 2A, 2B and thus are emitted therefrom as converged lights. The converged lights form an image on (or near) an incident end surface of the rod integrator 7.

The converged lights emitted from the lamp reflectors 2A, 2B are reflected to be deflected by the folding mirrors 3A, 3B and then enter the condenser lens 4. At this time, the light ray bundles from the lamp reflectors 2A, 2B opposing to each other are reflected by the folding mirrors 3A, 3B, respectively, such that the light ray bundles from the folding mirrors 3A, 3B concurrently enter the condenser lens 4. The respective light ray bundles passed through the condenser lens 4 enter the deflection prism 5 having two refraction areas. Two illumination lights which enter the deflection prism 5 are substantially positionally separated from each other and enter respective corresponding refraction areas. Thereby, an angle difference between respective principal rays is reduced and an angular distribution difference between the respective light ray bundles is also reduced. Therefore, it is possible to obtain an illumination system which causes smaller variations in an illuminance-distribution characteristic even in a case of lighting only one of the light sources.

Figure 7:
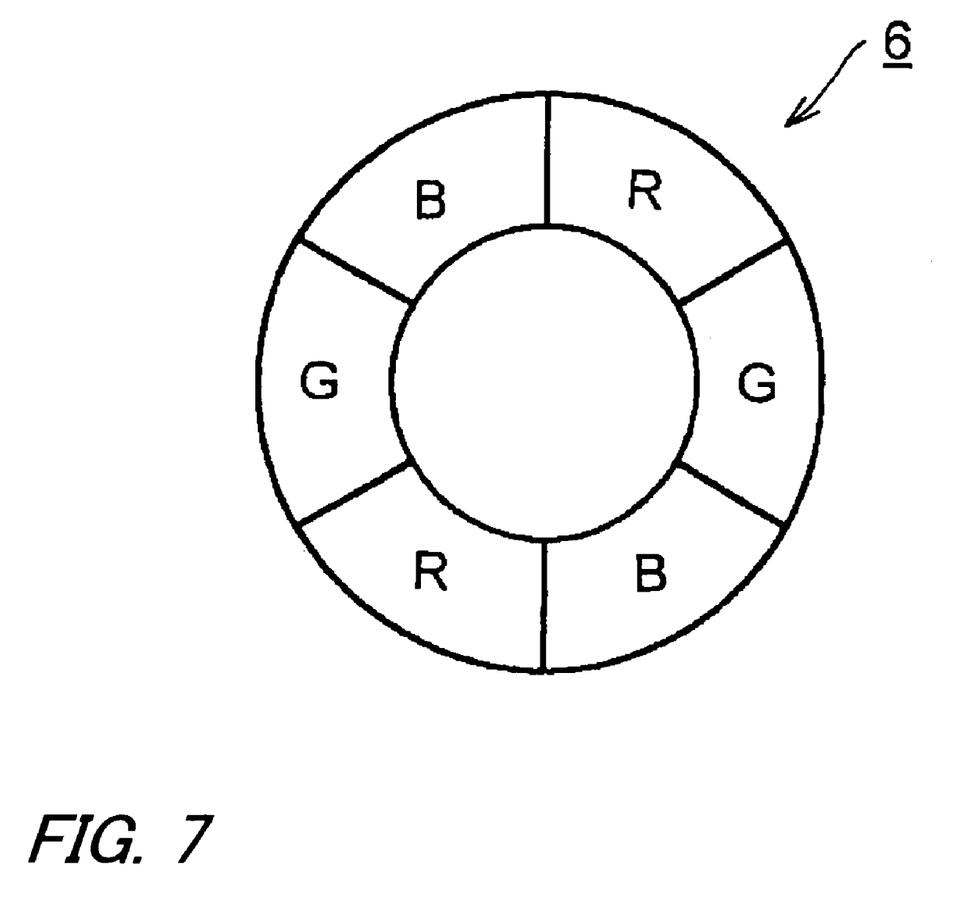
FIG. 7 is a plan view illustrating a filter configuration of a color wheel.

The two light ray bundles passed through the deflection prism 5 enter the color wheel 6 for varying a color of an emitted light in a time-division manner for performing color displaying. The color wheel 6 includes color filters for illuminating the display device 13 in a color sequential manner. For example, as illustrated in FIG. 7, the color wheel 6 is constituted by color filters which pass therethrough light of respective colors of R (red), G (green) and B (blue). When the color wheel 6 is rotated, the filter portions thereof at illumination-light transmitting positions are rotated and moved, thereby successively changing the illumination color light with time. Accordingly, by displaying, on the display device 13, image information corresponding to the respective colors, it is possible to color the projected image.

The light ray bundles passed through the color wheel 6 enter the rod integrator 7. The rod integrator 7 is a hollow-rod type light-intensity uniformizing means constituted by four plane mirrors attached to one another. The incident end surface thereof is positioned near the secondary light sources. The illumination light entered from the incident end surface is repeatedly reflected by side surfaces 7 (namely, inner wall surfaces) of the rod integrator for multiple times to be mixed with each other, uniformizing a spatial energy distribution of the illumination light to be emitted from the emission end surface. The incident end surface and the emission end surface of the rod integrator 7 have rectangular shapes similar to the image display surface of the display device 13. Further, there is a conjugate relationship between the emission end surface of the rod integrator 7 and the image display surface of the display device 13. Accordingly, the display device 13 can be efficiently and uniformly illuminated, since brightness distribution is uniformized over the emission end surface by the aforementioned mixing effect. Namely, plural secondary-light-source images are formed according to the number of reflections at the rod integrator 7 to be superimposed through the relay optical system 8, so as to attain uniform illumination.

The rod integrator 7 is not limited to a hollow rod and may be a glass rod made of a glass member having a rectangular-column shape. Also, the side surfaces thereof are not limited to four surfaces, provided that they conform to the shape of the image display surface of the display device 13. Accordingly, as the rod integrator 7, it is possible to employ a hollow tubular member constituted by a combination of plural reflection mirrors, a glass member having a polygonal column shape or the like.

Also, in order to generate secondary-light-source images for attaining uniform illumination, it is possible to employ a lens-array type integrator. The lens-array type integrator is constituted by a first lens array plate, a second lens array plate and a convex lens. The first lens array plate is a lens array plate constituted by arranging plural lenses having a shape substantially similar to that of the display device and divides the light ray bundles into plural light sources (secondary light sources). The second lens array plate is a lens array plate placed near the secondary light sources and constituted by arranging lenses, of which the number is the same as that of the secondary light sources. The secondary light sources near the secondary lens array plate are superimposed on the display device 13 through the convex lens to provide uniform illumination. There is a conjugate relationship between the first lens array plate and the display device 13 (refer to, for example, U.S. Pat. No. 6,089,720).

The illumination light emitted from the rod integrator 7 passes through the relay optical system 8 and the variable stop mechanism 9 in this order, then is reflected by the mirrors 10 and 11 and the prism unit 12 in this order and enters the image display surface of the display device 13. The relay optical system 8 relays the illumination light to cause the emission end surface of the rod integrator 7 to form an image on the image display surface of the display device 13. Namely, on the image display surface of the display device 13, an image of the emission end surface of the rod integrator 7 is formed. Further, the relay optical system 8 forms a surface conjugated with the incident end surface of the rod integrator 7, near a light-ray-bundle emission position thereof. On the conjugate surface, plural secondary-light-source images are formed.

On the image display surface of the display device 13, a two-dimensional image is formed through modulation of the illumination light. In this case, it is assumed that the display device 13 is a digital micromirror device. However, the display device 13 to be used is not limited thereto, and it is also possible to employ another reflection type display device (for example, liquid crystal display device) suitable for the projection system. In a case of employing the digital micromirror device as the display device 13, the light incident thereto is spatially modulated by being reflected by the respective micromirrors being at ON/OFF states (for example, states of being angled by ±12 degrees). At this time, only the light reflected by the micromirrors being at the ON state passes through the prism unit 12 and then enters the projection lens 14. As a result, the image displayed on the display device 13 is projected onto a screen in an enlarged manner. Further, the prism unit 12 is constituted by a TIR (Total Internal Reflection) prism for reflecting the illumination light while passing the projected light therethrough.

The variable stop mechanism 9 provided in the illumination system forms a variable stop for dynamically changing the quantity of projected light at a high speed (for example, at a high speed which is indistinguishable by humans), according to the brightness of the image displayed on the image display surface of the display device 13. The variable stop restricts the quantity of light, at (or near) the position of the plural secondary-light-source images generated by the rod integrator 7. In the present embodiment, the position is near the light-ray-bundles exit of the relay optical system 8. Further, the variable stop mechanism 9 operates at a high speed (for example, at every frame) to open or close the stop, based on information on the brightness of the image included in image signals, to change the brightness and darkness of the projected image. For example, for a dark scene, the variable stop mechanism 9 reduces the quantity of projected light to express a sharp black color, while, for a bright scene, it increases the quantity of projected light for causing a screen to become clear. It is possible to increase a dynamic range according to the scene, thereby enabling to express a picture with excellent contrast feeling.

Figure 9:
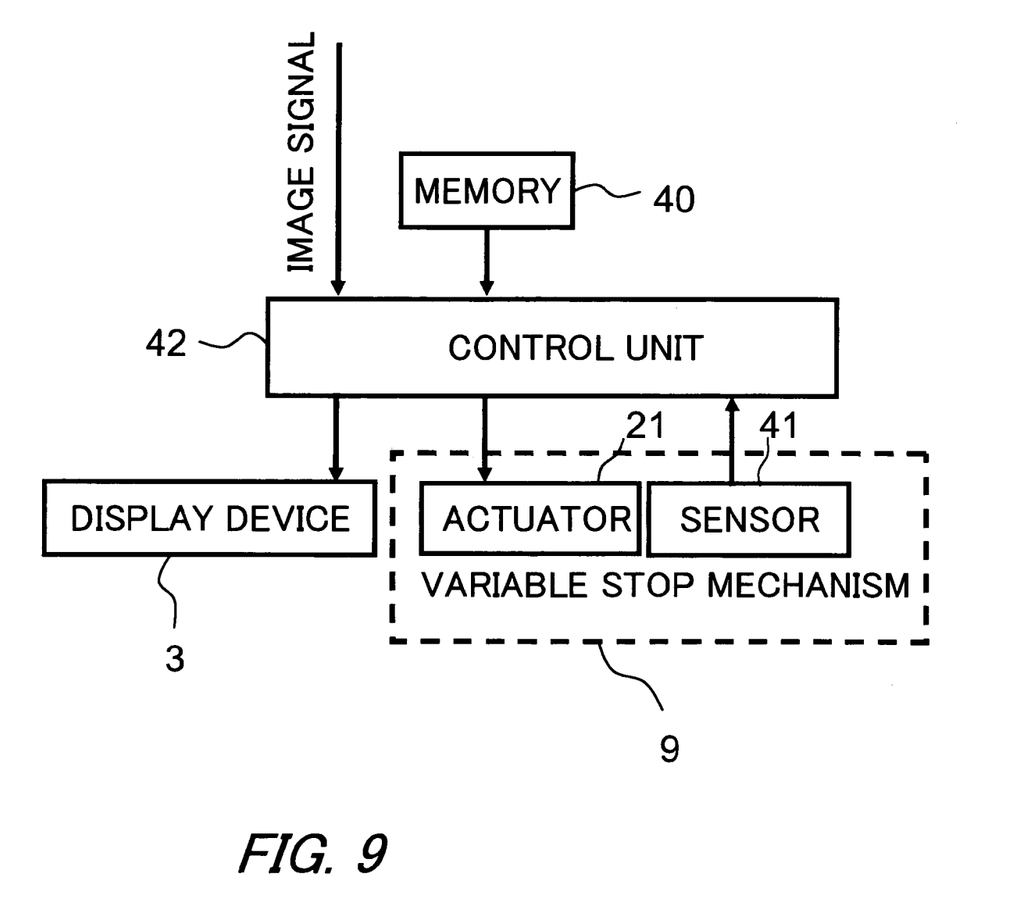
FIG. 9 is a control block diagram of the image projecting apparatus.

FIG. 9 is a control block diagram of the image projecting apparatus. The image projecting apparatus includes a memory 40 for storing data defining a relationship between the position at which a stop blade 23 stays and the quantity of light passing through a variable stop ST, a sensor 41 for determining the position at which the stop blade stays, and a control unit 42 for driving the illumination optical system 4 and controlling the display device 13 based on image signals for a video, a television and the like, in addition to the display device 13, the integrator 7, the projection optical system 14 and the variable stop mechanism 9. The control unit 42 generates driving signals for driving an actuator 21 in the variable stop mechanism 9 and modified image signals for the display device 13, based on image signals and data from the memory 40 and transmits these signals.

Figure 3A:
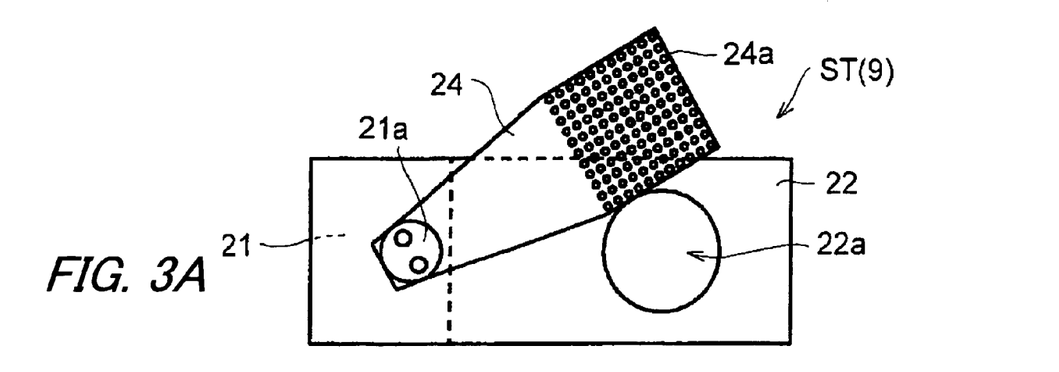
FIGS. 3A-3C are schematic views illustrating a concrete example 2 of a variable stop mechanism according to the present invention.
Figure 3B:
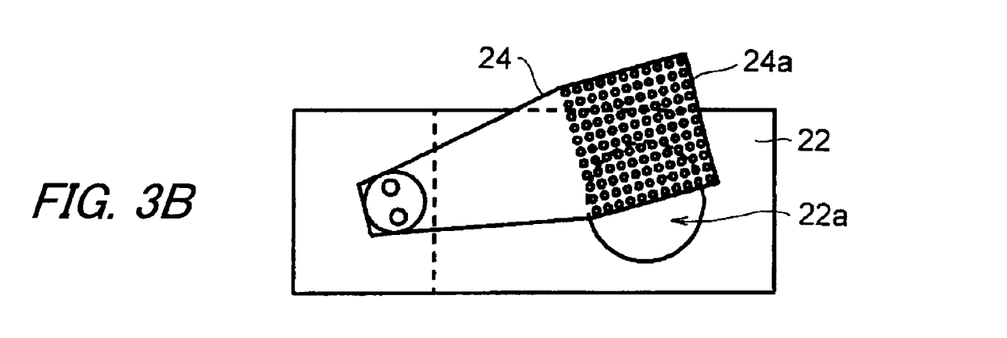
Figure 3C:
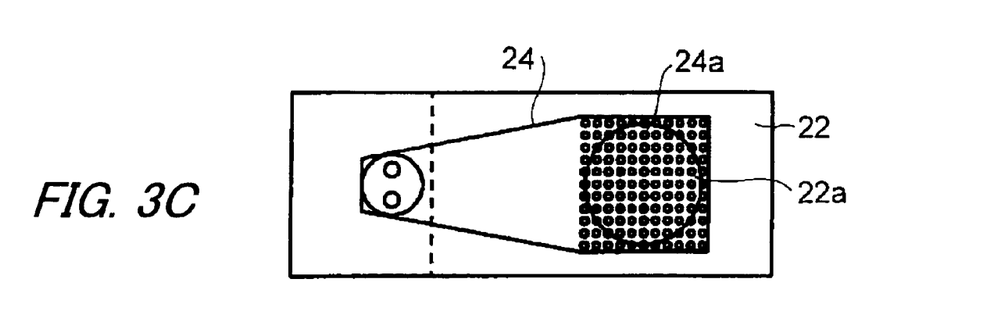
Figure 4A:
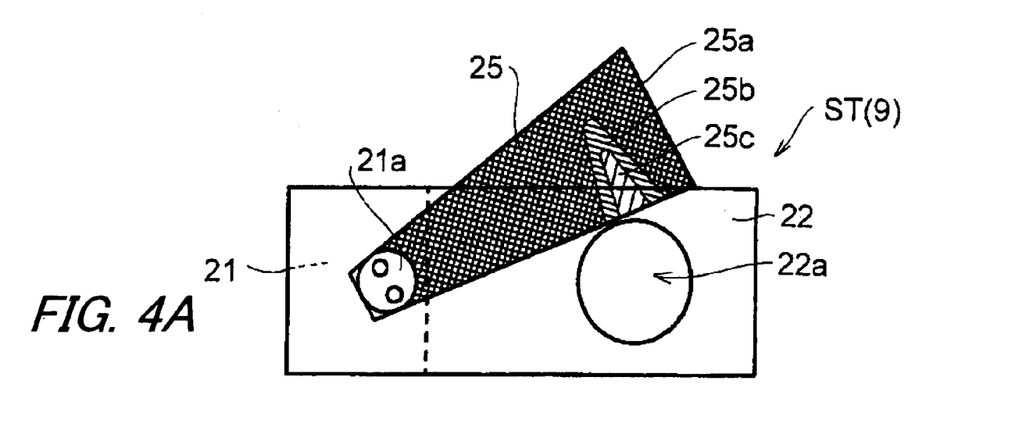
FIGS. 4A-4C are schematic views illustrating a concrete example 3 of a variable stop mechanism according to the present invention.
Figure 4B:
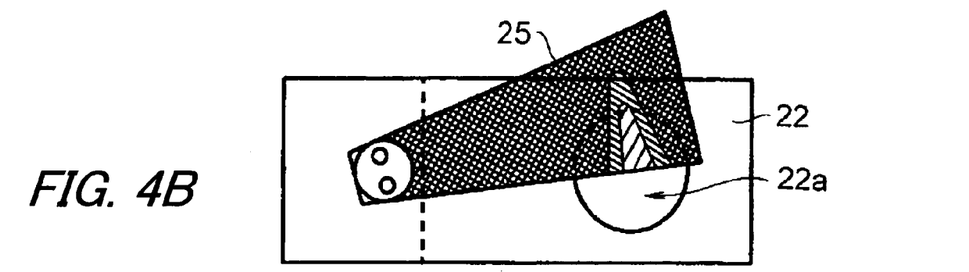
Figure 4C:
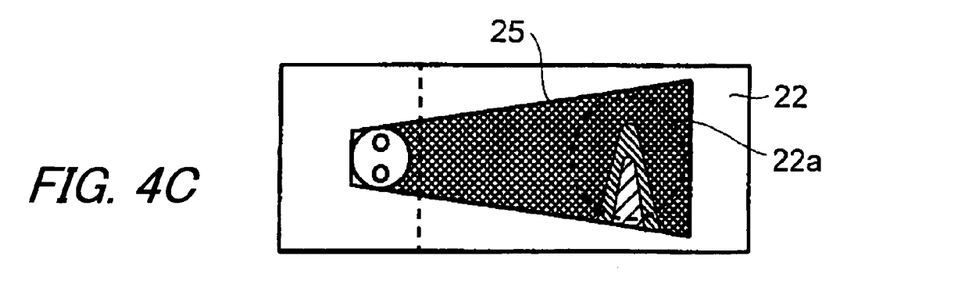

Next, there will be described the variable stop mechanism 9 preferably usable in the image projecting apparatus of FIG. 1, by providing concrete examples. FIGS. 2 to 5 illustrate respective concrete examples 1 to 4 of the variable stop mechanism 9 which forms the variable stop ST. FIGS. 2 to 4 illustrate the concrete examples 1 to 3 of a single-blade type variable stop mechanism 9. FIG. 5 illustrates the concrete example 4 of a double-blade type variable stop mechanism 9.

Figure 2A:
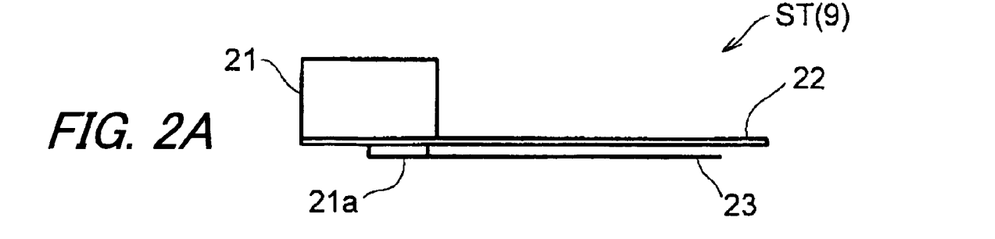
FIGS. 2A-2D are schematic views illustrating a concrete example 1 of a variable stop mechanism according to the present invention.
Figure 2B:
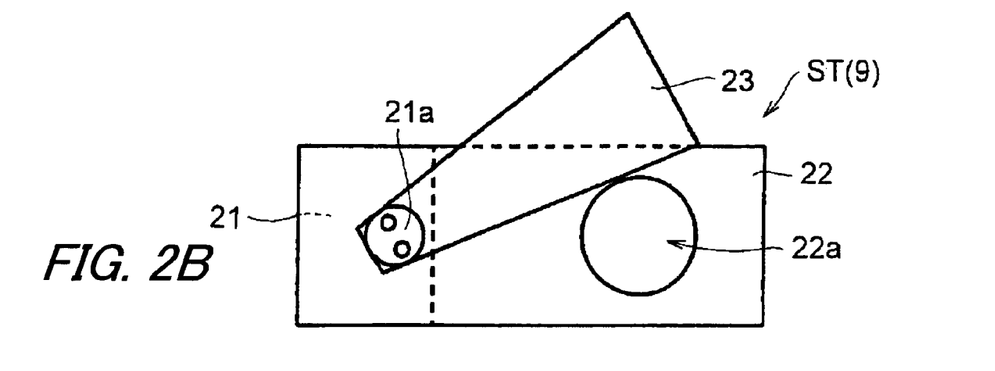
Figure 2C:
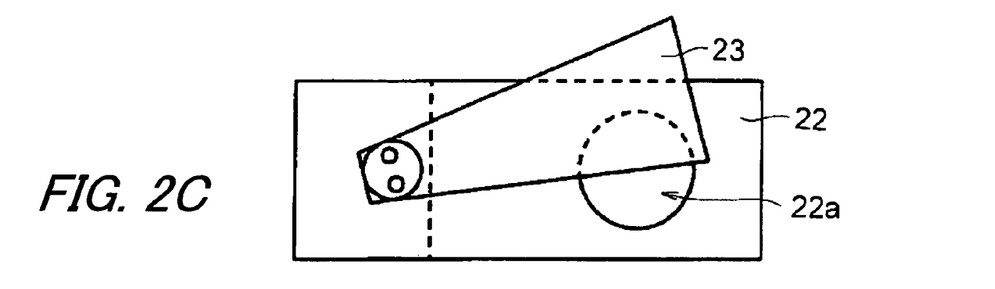
Figure 2D:
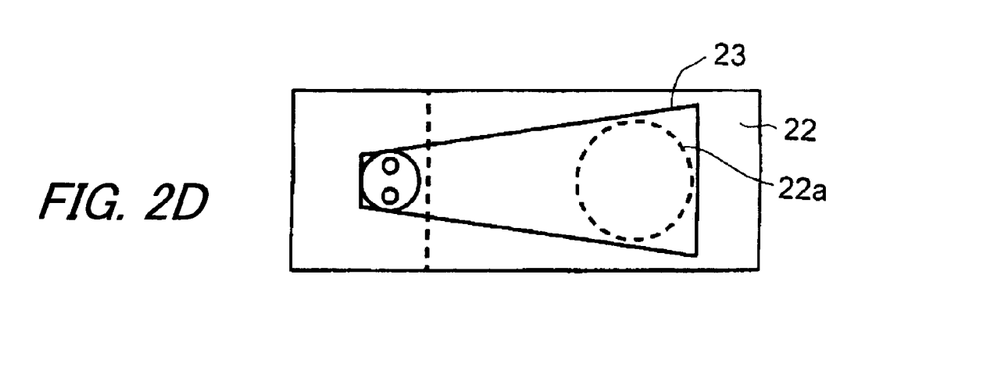

FIG. 2A is a plan view illustrating, seen from above, the concrete example 1 of the variable stop mechanism 9, and FIGS. 2B to 2D are front views illustrating, seen from the side of the relay optical system 8 along an optical axis, stop opening/closing operations thereof. FIG. 2B illustrates a state where the stop is opened, FIG. 2C illustrates a state midway through the opening/closing of the stop (namely, a state where a fixed aperture 22a is half covered with the stop blade 23), and FIG. 2D illustrates a state where the stop is closed. The variable stop mechanism 9 according to the concrete example 1 is constituted by the actuator 21 formed of a voice coil motor, a base plate 22 (made of a metal, for example) having the fixed aperture 22a defining an aperture diameter in a opened state, the stop blade 23 constituted by an ND (Neutral Density) filter.

The stop blade 23 is mounted to the actuator 21 with the base plate 22 interposed therebetween and is made rotatable about a shaft 21a by the actuator 21. The aperture setting through the variable stop ST is performed by intruding the stop blade 23 into the fixed aperture 22a of the base plate 22. The position of the stop blade 23 is detected by the sensor 41 (not illustrated), and data defining the relationship between the position at which the stop blade 23 stays and the quantity of light passing through the variable stop ST is separately stored in the memory 40. Accordingly, the quantity of light passing through the variable stop ST is controlled, by controlling the position at which the stop blade 23 stays, based on picture information.

The stop blade 23 is constituted by an ND filter with transmittance of 25%. Accordingly, in a state where the stop is closed (FIG. 2D), the total quantity of light is restricted to ¼. As the type of the ND filter, there have been known an absorption type (type made of a material containing a light-absorbing component) and a coating type (type including a coating such as a dielectric multi-layer film, a metal thin film and the like). In a case of placing the variable stop ST in the projection system, it is preferable to employ the absorption type ND filter, in order to prevent the reflected light from causing a stray light. On the contrary, in a case of placing the variable stop ST in the illumination system, it is preferable to employ the coating type ND filter with a high reflectivity, in view of heat and reliability, since an optical energy is large.

In a case of fabricating the ND filter, it is preferable to employ a substrate made of a material such as a heat-resistant glass with a lower linear thermal expansion coefficient, sapphire with a high thermal conductivity. By employing the substrate made of such a material, it is possible to effectively prevent a fracture and the like due to the absorbed heat of the illumination light. Thereby, it is possible to improve reliability. Also, by directing for cooling, to the variable stop mechanism 9, a portion of air flow generated by a fan which cools the color wheel motor (not illustrated), it is possible to further improve the reliability against heat. Also, by employing as the substrate a glass with higher flexibility while being less prone to the fracture such as one employed in large-screen liquid crystal televisions and the like, it is possible to further improve the reliability against load acting thereon during the aperture-setting operation.

There will be studied a case where a light shielding member which passes no light ray therethrough is employed as the stop blade 23 (instead of the ND filter) for restricting the quantity of light, in the variable stop mechanism 9 illustrated in FIG. 2. If it is assumed that the quantity of light passing through the variable stop ST in the stop-opened state illustrated in FIG. 2B is 100, the quantity of light passing through the variable stop ST in the state midway through the opening/closing of the stop illustrated in FIG. 2C is 50, and the quantity of light passing through the variable stop ST in the stop-closed state illustrated in FIG. 2D is 0. Accordingly, the change in the quantity of light passing through the variable stop ST from before to after the aperture setting is 100%. Further, if it is assumed that the size of the effective region of the stop aperture in the stop-opened state illustrated in FIG. 2B is 100, the size of the effective region of the stop aperture in the state midway through the opening/closing of the stop illustrated in FIG. 2C is 50, and the size of the effective region of the stop aperture in the stop-closed state illustrated in FIG. 2D is 0. Accordingly, the change in the size of the effective region of the stop aperture from before to after the aperture setting is also 100%.

By performing the aperture setting with the variable stop ST as described above, the quantity of light passing through the variable stop ST changes and, also, the size of the effective region of the stop aperture changes. This causes some of plural secondary-light-source images to be intercepted thereby, which reduces the number of the secondary-light-source images passing through the variable stop ST. As a result, it becomes impossible to obtain illumination with the uniform illuminance distribution with the rod integrator 7. If light-source images are uniformly distributed over the effective region of the stop aperture, the quantity of light passing through the variable stop changes substantially in proportion to the effective region area of the stop aperture. However, a variable stop generally used in the image projecting apparatus causes the distribution of the secondary-light-source images to be non-uniform, thereby the brightness becomes higher in a screen center portion than in a screen peripheral portion. This reduces the change in the quantity of light passing through the variable stop ST with respect to the change in the effective region of the stop aperture, thereby significantly degrading the uniform illumination effect of the rod integrator 7. Also, in a case of performing the aperture setting through the variable stop ST, the F number of the projection system becomes larger (namely, the brightness becomes smaller) and the depth of focus increases, causing the dust and the like adhered to another optical component near the surface conjugate with the screen (for example, cover glass of the display device) to become conspicuous on the projection screen.

Next, similarly to the aforementioned case, there will be studied a case where the stop blade 23 formed of the ND filter (transmittance of 25%) is employed for restricting the quantity of light, in the variable stop mechanism 9 illustrated in FIG. 2. If it is assumed that the quantity of light passing through the variable stop ST in the stop-opened state illustrated in FIG. 2B is 100, the quantity of light passing through the variable stop ST in the state midway through the opening/closing of the stop illustrated in FIG. 2C is 62.5 (=50*0.25+50), and the quantity of light passing through the variable stop ST in the stop-closed state illustrated in FIG. 2D is 25. Accordingly, the change in the quantity of light passing through the variable stop ST from before to after the aperture setting is 75%. Further, if it is assumed that the size of the effective region of the stop aperture in the stop-opened state illustrated in FIG. 2B is 100, the size of the effective region of the stop aperture in the state midway through the opening/closing of the stop illustrated in FIG. 2C is also 100, and the size of the effective region of the stop aperture in the stop-closed state illustrated in FIG. 2D is also 100. Accordingly, the change in the size of the effective region of the stop aperture from before to after the aperture setting is 0%.

When the change in the quantity of light passing through the variable stop ST is greater than the change in the size of the effective region of the stop aperture from before to after the aperture setting, as described above, even if the aperture setting is performed through the variable stop ST, it is possible to suppress the reduction in the number of the secondary-light-source images passing through the variable stop ST due to the aperture setting. As a result, the uniform illumination effect of the rod integrator 7 can be maintained. In the state midway through the opening/closing of the stop illustrated in FIG. 2C, the quantities of lights of some of the secondary-light-source images are reduced thereby increasing the non-uniformity of the illumination to some degrees, but the quantity of light can be reduced without reducing the number of the secondary-light-source images, the illuminance distribution with higher uniformity can be maintained in comparison to the case of employing the light shielding member which passes no light therethrough for restricting the quantity of light. Further, it is possible to perform the aperture setting through the variable stop ST in such a manner as to prevent the increase of the F number of the projection system thus resulting in the increase of the depth of focus, it is possible to prevent the dust and the like adhered to the optical component near the surface conjugate with the screen from being conspicuous on the projection screen. Thereby, it is possible to cause the variable stop ST to effectively function while maintaining the uniform illumination effect of the rod integrator 7. For example, by providing the variable stop mechanism for dynamically changing the quantity of projected light according to the brightness of the image to be displayed on the surface of the display device, it is possible to emphasize the brightness and darkness of the displayed picture scene to increase the contrast thereof.

From the aforementioned viewpoint, in the image projecting apparatus including the integrator for generating the plural secondary-light-source images and the variable stop for restricting the quantity of light at (or near) the position conjugate with the secondary-light-source images, it is preferable that the change in the quantity of light passing through the variable stop is greater than the change in the size of the effective region of the stop aperture from before to after the aperture setting. In the aforementioned configuration, it is possible to maintain a greater number of the secondary-light-source images with a desired brightness, thereby maintaining the uniform illuminance distribution, as described above. In concretizing the variable stop, it is further preferable to form the variable stop of the base plate having the fixed aperture and the stop blade which is intruded into the fixed aperture for performing the aperture setting, and also to configure such that the change in the quantity of light passing through the variable stop is greater than the change in the size of the effective region of the stop aperture from before to after the aperture setting.

As the configuration in which the change in the quantity of light passing through the variable stop is greater than the change in the size of the effective region of the stop aperture, it is preferable to adopt the configuration such that at least the portion of the stop aperture of the variable stop has the characteristic of the ND filter, as in the concrete example 1. More specifically, it is preferable to adopt the configuration such that at least partially the portion of the stop blade intruding into the fixed aperture has the characteristic of the ND filter. By employing the ND filter, it is possible to prevent the change in the size of the effective region (namely, the effective area) of the stop aperture even when the aperture setting is performed through the variable stop, thereby preventing the change in the number of the secondary-light-source images passing therethrough. This can reduce the quantity of transmitted light without restricting the region for transmitting the light rays therethrough, with a simple configuration.

In a case of lighting only the single light source in the double-light type illumination system as that in the image projecting apparatus illustrated in FIG. 1, there is caused large non-uniformity in the distribution of the secondary-light-source images, thereby causing conspicuous non-uniformity in the illuminance distribution. Accordingly, as described above, it is more effective in the configuration in which the change in the quantity of light passing through the variable stop is greater than the change in the size of the effective region of the stop aperture and, more particularly, the configuration in which at least the portion of the stop aperture has the characteristic of the ND filter. If there is a large difference in the relationship between the stop position and the change in the quantity of light between the case of concurrently lighting the two light sources and the case of lighting only the single light source, it is necessary to pre-store, as data on the respective utilization states, the relationship between the position of the variable stop (namely, the position of the stop blade) and the change in the quantity of light. It is preferable to cause the stop blade to intrude into the fixed aperture in a way of being symmetric as much as possible in a direction in which the two lights are combined, in order to reduce the required data. This enables setting the change in the quantity of light through the variable stop to a same amount, in a case of lighting either one of the light sources, reducing the required data.

Next, the concrete example 2 of the variable stop mechanism 9 will be described. In FIG. 3, FIGS. 3A to 3C are front views illustrating, from the side of the relay optical system 8 along the optical axis, stop opening/closing operations according to the concrete example 2. FIG. 3A illustrates a state where the stop is opened, FIG. 3B illustrates a state midway through the opening/closing of the stop (namely, a state where the fixed aperture 22a is half covered with the stop blade 24), and FIG. 3C illustrates a state where the stop is closed. The variable stop mechanism 9 according to the concrete example 2 is constituted by the actuator 21 formed of the voice coil motor, the base plate 22 having the fixed aperture 22a defining the aperture diameter in the opened state, and the stop blade 24 made of a light-shielding plate having mesh-shaped small apertures 24a. The stop blade 24 can be fabricated by punching a plate made of a metal (aluminum and the like). Accordingly, it can be fabricated with lower cost than in a case of using the ND filter. Also, by employing a lustrous material having a higher reflectivity or applying reflectivity-increasing processing such as plating, it is possible to ensure the reliability against heat and the like.

The stop blade 24 is mounted to the actuator 21 with the base plate 22 interposed therebetween, and is made rotatable about the shaft 21a by the actuator 21. The aperture setting through the variable stop ST is performed by intruding the stop blade 24 into the fixed aperture 22a of the base plate 22. The position of the stop blade 24 is detected by a sensor (not illustrated), and data defining the relationship between the position at which the stop blade 24 stays and the quantity of light passing through the variable stop ST is separately stored in a memory (not illustrated). Accordingly, the quantity of light passing through the variable stop ST is controlled, by controlling the position at which the stop blade 24 stays, based on the picture information.

The stop blade 24 is made of the light-shielding member provided with plural small apertures 24a for providing the transmittance of 25%, while the aforementioned stop blade 23 (FIG. 2) is formed of the ND filter with transmittance of 25%. Namely, the plural small apertures 24a are provided therein, such that the portion of the stop blade 24 which intrudes into the fixed aperture 22a has an opening area of 25%. Consequently, the total quantity of light is restricted to ¼ in the stop-closed state (FIG. 3D), similarly to the concrete example 1. However, the size of the effective region of the stop aperture is substantially not different from that in the stop-opened state (FIG. 3A), which allows the light ray bundles from the large number of the secondary-light-source images to pass through the stop aperture. As in the concrete example 1, this enables the aperture setting without reducing the number of the secondary-light-source images passing through the variable stop ST, which causes the variable stop ST to effectively function while maintaining the uniform illumination effect of the rod integrator 7.

As the configuration in which the change in the quantity of light passing through the variable stop is greater than the change in the size of the effective region of the stop aperture, it is preferable to adopt the configuration such that the stop aperture set by the variable stop is formed of the plural apertures, as in the concrete example 2. More specifically, it is preferable to adopt the configuration such that the effective region of the stop aperture set by the stop blade is formed of the plural apertures. By forming the set stop aperture of the plural apertures, the change in the size of the effective region (namely, the effective area) of the stop aperture is small even when the aperture setting is performed through the variable stop, thereby suppressing the change in the number of the secondary-light-source images passing therethrough. Therefore, it is possible to reduce the quantity of the transmitted light without restricting the region for transmitting the light rays therethrough, with the simple configuration.

Next, the concrete example 3 of the variable stop mechanism 9 will be described. In FIG. 4, FIGS. 4A to 4C are front views illustrating, from the side of the relay optical system 8 along the optical axis, the stop opening/closing operations according to the concrete example 3. FIG. 4A illustrates the state where the stop is opened, FIG. 4B illustrates the state midway through the opening/closing of the stop (namely, the state where the fixed aperture 22a is half covered with the stop blade 25), and FIG. 4C illustrates the state where the stop is closed. The variable stop mechanism 9 according to the concrete example 3 is constituted by the actuator 21 formed of the voice coil motor, the base plate 22 having the fixed aperture 22a defining the aperture diameter in the opened state, and the stop blade 25 made of the ND filter having plural regions of different transmittances.

The stop blade 25 is mounted to the actuator 21 with the base plate 22 interposed therebetween, and is made rotatable about the shaft 21a by the actuator 21. The aperture setting through the variable stop ST is performed by intruding the stop blade 25 into the fixed aperture 22a of the base plate 22. The position of the stop blade 25 is detected by the sensor (not illustrated), and the data defining the relationship between the position at which the stop blade 25 stays and the quantity of light passing through the variable stop ST is separately stored in the memory (not illustrated). Accordingly, the quantity of light passing through the variable stop ST is controlled, by controlling the position at which the stop blade 25 stays, based on the picture information.

In the concrete example 3, the stop blade 25 having the regions of different transmittances is employed. The stop blade 25 is formed of the ND filter having three regions of different transmittances (namely, a first region 25a having transmittance of 0%, a second region 25b having transmittance of 25% and a third region 25c having transmittance of 50%), while the aforementioned stop blade 23 (FIG. 2) is formed only of the ND filter having the transmittance of 25%. The respective transmittances of the first, second and third regions 25a, 25b and 25c are set such that light ray bundles close to the center of the optical axis can transmit therethrough more easily, without degrading the illuminance distribution. Since light ray bundles closer to the optical axis center have higher contrast in the same quantity of light, the respective transmittances are determined according to the balance between the illuminance distribution and the contrast feeling. It is also possible to vary the transmittance in the region of the stop blade 25 in a continuously gradual manner.

In the aperture setting through the variable stop ST, the area of the fixed aperture 22a covered with the first region 25a (with the transmittance of 0%) is increased. However, the change in the quantity of light passing through the variable stop ST is greater than the change in the size of the effective region of the stop aperture, thereby suppressing the reduction in the number of the secondary-light-source images passing through the variable stop ST due to the aperture setting. This enables the variable stop ST to effectively function while maintaining the uniform illumination effect of the rod integrator 7, similarly to the concrete example 1.

It is also possible to set the transmittance according to the area of the small apertures provided in the light-shielding member, as in the aforementioned stop blade 24 (FIG. 3). Accordingly, the stop blade 25 may be formed of the light-shielding member provided with the plural small apertures such that the first region 25a has the transmittance of 0%, the second region 25b has the transmittance of 25% and the third region 25c has the transmittance of 50%. By providing non-transparent small regions without causing influences of F diffraction and controlling the transmittance with such a ratio (for example, by adjusting density, a size and the like of the apertures smaller than the secondary-light-source images), it is possible to provide a characteristic similar to that of the ND filter, in broad perspective. In this case, it is possible to easily fabricate one having gradually-varied transmittances. For example, reflective coating can be applied to a glass substrate, using a mask having apertures corresponding to such small non-transparent regions.

Figure 5A:
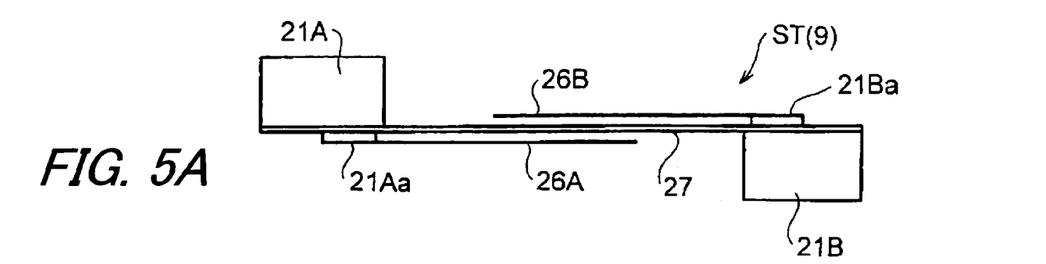
FIGS. 5A-5D are schematic views illustrating a concrete example 4 of a variable stop mechanism according to the present invention.
Figure 5B:
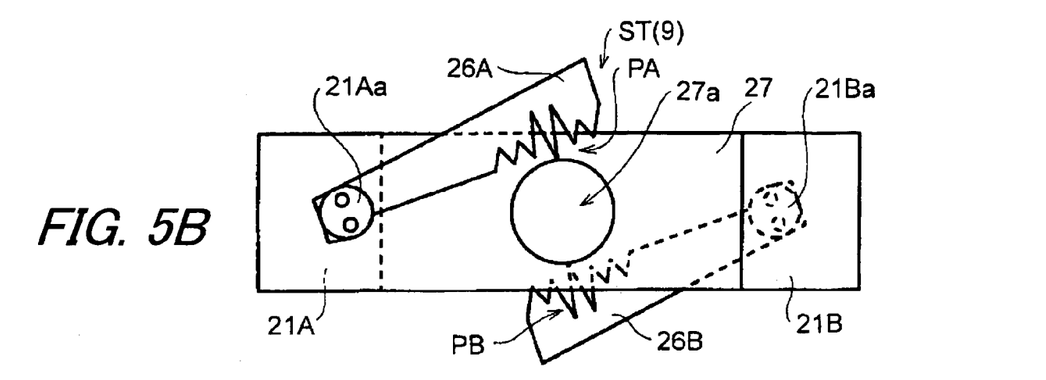
Figure 5C:
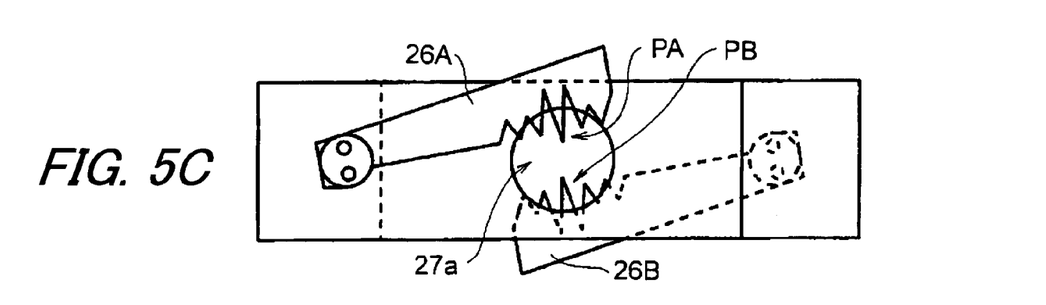
Figure 5D:
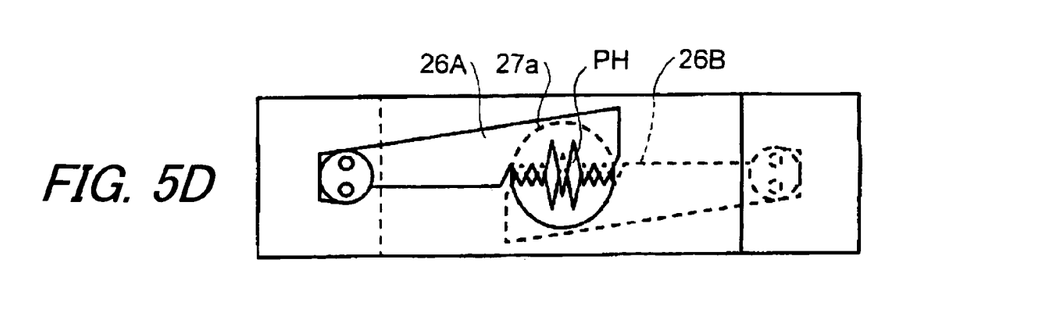

Next, the concrete example 4 of the double-blade type variable stop mechanism 9 will be described. FIG. 5A is a plan view illustrating the concrete example 4 of the double-blade type variable stop mechanism 9, seen from above. FIGS. 5B to 5D are front views illustrating, from the side of the relay optical system 8 along the optical axis, the stop opening/closing operations thereof. In FIG. 5, FIG. 5B illustrates the state where the stop is opened, FIG. 5C illustrates the state midway through the opening/closing of the stop (namely, the state where a fixed aperture 27a is half covered with stop blades 26A and 26B), and FIG. 5D illustrates the state where the stop is closed. The variable stop mechanism 9 according to the concrete example 4 is constituted by actuators 21A and 21B formed of the voice coil motors, a base plate 27 (made of metal, for example) having the fixed aperture 27a defining the aperture diameter in the opened state, and the stop blades 26A and 26b (made of metal, for example) having sawtooth-shaped portions PA and PB.

The stop blades 26A and 26B are mounted to the actuators 21A and 21B with the base plate 22 interposed therebetween, and are made rotatable about shafts 21Aa and 21Ba by the actuators 21A and 21B. The aperture setting through the variable stop ST is performed by intruding the stop blades 26A and 26B into the fixed aperture 27a of the base plate 27. The positions of the stop blades 26A and 26B are detected by sensors (not illustrated), and data defining the relationship between the positions at which the stop blades 26A and 26B stay and the quantity of light passing through the variable stop ST is separately stored in the memory (not illustrated). Accordingly, the quantity of light passing through the variable stop ST is controlled, by controlling the positions at which the stop blades 26A and 26B stay, based on the picture information.

By employing the plural stop blades as in the concrete example 4 (FIG. 5), it is possible to perform the aperture setting in a more symmetric form. This can provide an advantage that the uniform illuminance distribution can be easily maintained even midway through the aperture setting. Further, the use of the plural stop blades is preferable particularly in the case of using the double-light system. By using the plural stop blades for shielding light such that the direction of arranging the two light sources becomes a symmetry axis, it is possible to prevent the illuminance distribution and a way of the change in the quantity of light from significantly changing, even in the case of lighting only one of the light sources. If the plural stop blades are operated with the single actuator, it will be required to operate some of the stop blades through a link mechanism. The use of such a link mechanism will increase difficulty of performing accurate positioning due to clearance or the like in the mechanism. Further, if the clearance in the link mechanism is tightened, difficulty in performing control at a high speed is increased, thereby causing the problem of degradation of the durability. In the concrete example 4, the single actuator and the single position sensor are provided for each of the stop blades to overcome the aforementioned problem, thereby realizing the variable stop mechanism which offers preferable illuminance distribution.

The stop blades 26A and 26B according to the concrete example 4 are made of the light-shielding members having the sawtooth portions PA and PB, while the stop blade 24 (FIG. 3) according to the aforementioned concrete example 2 is formed of the light shielding member having the plural small apertures 24a. Further, the stop blades 26A and 26B are formed to have the sawtooth shapes which substantially conform to the distribution of the secondary-light-source images in the double-light type illumination system, so that plural apertures PH are formed according to the stop-closed state of FIG. 5D. This can suppress the change in the size of the effective region of the stop aperture to be smaller than the change in the quantity of light actually passing through the variable stop, and also can prevent the illuminance distribution and the way of changing the quantity of light from significantly changing, even in the case of lighting only one of the light sources.

Further, since the stop blades 26A and 26B are considered to be equivalent to the stop blade made of the light shielding plate having coarse and large apertures, the region surrounding the plural apertures PH (the region having substantially an elliptical shape) in the stop-closed state in FIG. 5D corresponds to the effective region of the stop aperture. By forming the set stop aperture of the plural apertures PH as described above, an amount of reduction in the size of the effective region (namely, the effective area) of the stop aperture is smaller even when the aperture setting is performed through the variable stop ST, thereby suppressing reduction in the number of the secondary-light-source images passing therethrough. This can reduce the quantity of transmitted light without restricting the region for transmitting the light rays therethrough, with a simple configuration. For example, if it is assumed that the quantity of light passing through the variable stop ST in the stop-opened state illustrated (FIG. 5B) is 100 and the size of the effective region of the stop aperture in the stop-opened state (FIG. 5B) is 100, the quantity of light passing through the variable stop ST in the stop-closed state illustrated (FIG. 5D) is 25, and the size of the effective region of the stop aperture in the stop-closed state (FIG. 5D) is in a range of 40 to 50. Accordingly, from before to after the aperture setting, the change in the quantity of light passing through the variable stop ST is 75%, and the change in the size of the effective region of the stop aperture is in a range of 50 to 60%.

Figure 6:
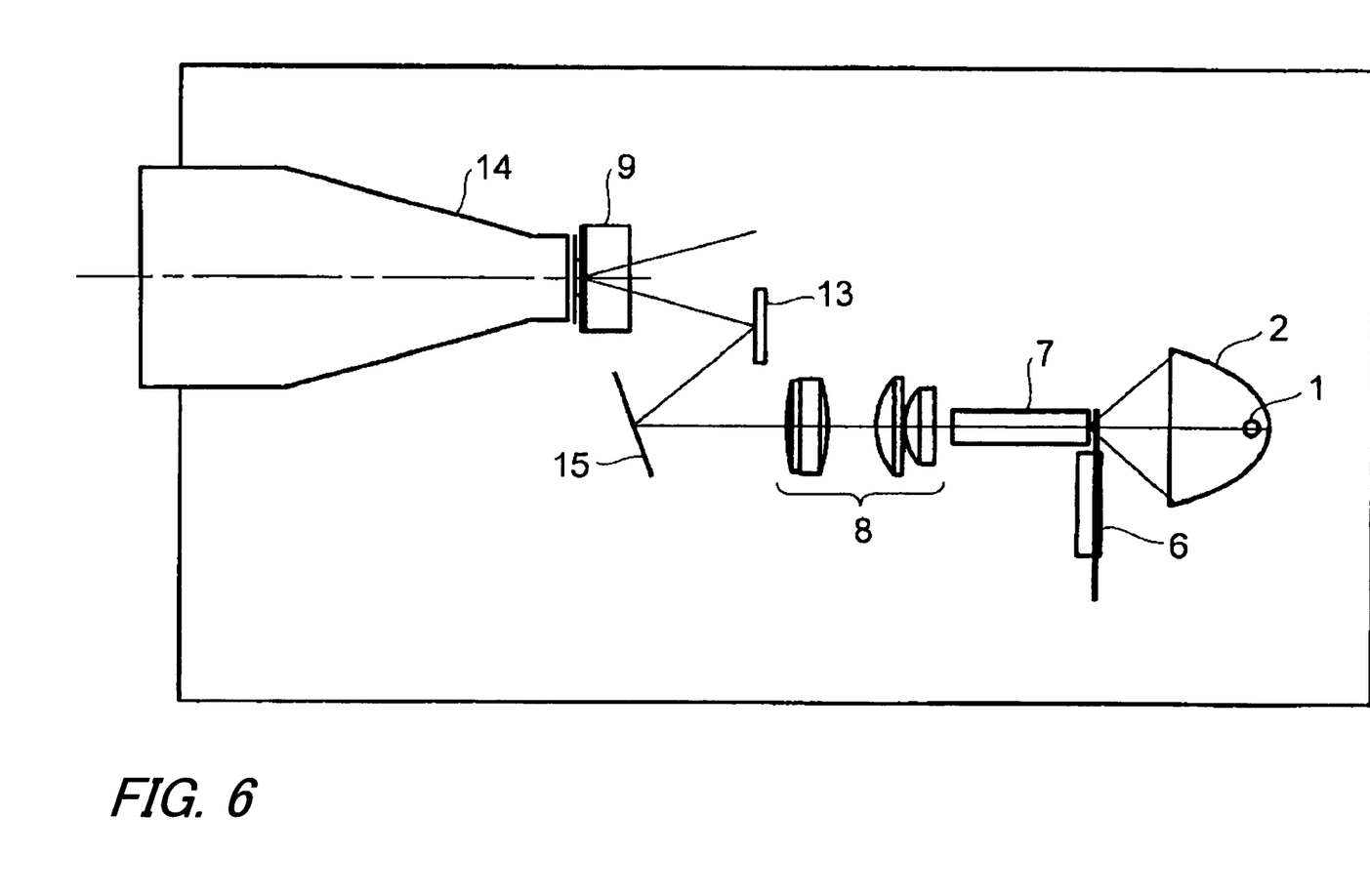
FIG. 6 is a side view illustrating an embodiment of an image projecting apparatus having a variable stop in a projection system.

FIG. 6 illustrates a view of an embodiment of the image projecting apparatus having the variable stop in an illumination system, in a lateral direction. In FIG. 6, reference sign 1 denotes the light source, reference sign 2 denotes the lamp reflector, reference sign 6 denotes the color wheel, reference sign 7 denotes the rod integrator, reference sign 8 denotes the relay optical system, reference sign 9 denotes the variable stop mechanism, reference sign 13 denotes the display device (a light valve or the like), reference sign 14 denotes the projecting lens, and reference sign 15 denotes the mirror. The aforementioned concrete examples 1 to 4 can be suitably used as the variable stop mechanism 9 (FIGS. 2 to 5). While the image projecting apparatus employs the single-light type illumination system, it may employ the double-light type illumination system as in the image projecting apparatus illustrated in FIG. 1.

The light source 1 is constituted by the electric-discharge lamp (for example, the supper-high pressure mercury-vapor which generates the white light. Namely, the lamp reflector 2 has the elliptical reflection surface, and the light source 1 is placed at the focal point thereof. Namely, the lamp reflector 2 is the elliptical surface mirror (the condensing optical system) for condensing the light generated from the light source 1 to form the secondary light source. The light ray bundles from the light source 1 are reflected by the lamp reflector 2 and thus are emitted therefrom as the converged light. Further, the converged light forms the image on (or near) the incident end surface of the rod integrator 7.

The converged light emitted from the lamp reflector 2 enters the color wheel 6 for varying the color of light emitted therefrom in a time-division manner, for performing color displaying. The color wheel 6 includes color filters for illuminating the display device 13 in the color sequential manner. For example, as illustrated in FIG. 7, the color wheel 6 is constituted by color filters which pass, therethrough, the light of respective colors which are R (red), G (green) and B (blue). When the color wheel 6 is rotated, the filter portions thereof at the illumination-light transmitting positions are rotated and moved, thereby successively changing the illumination color light with time. Accordingly, by displaying on the display device 13 the image information corresponding to the respective colors, it is possible to color the projected image.

The light ray bundles passing through the color wheel 6 enter the rod integrator 7. The rod integrator 7 is the hollow-rod type light-intensity uniformizing means constituted by four plane mirrors attached to one another, and the incident end surface thereof is positioned near the secondary light source. The illumination light entered from the incident end surface is repeatedly reflected by the side surfaces (namely, the inner wall surfaces) of the rod integrator 7 for multiple times to be mixed, which uniformizes the spatial energy distribution of the illumination light to be emitted from the emission end surface. The incident end surface and the emission end surface of the rod integrator 7 have rectangular shapes similar to the image display surface of the display device 13. Further, there is the conjugate relationship between the emission end surface of the rod integrator 7 and the image display surface of the display device 13. Accordingly, the display device 13 can be efficiently and uniformly illuminated, since the brightness distribution is uniformized over the emission end surface by the aforementioned mixing effect. Namely, the plural secondary-light-source images are formed according to the number of reflection at the rod integrator 7, and are superimposed on one another through the relay optical system 8 to attain uniform illumination.

Also, the rod integrator 7 is not limited to the hollow rod and also may be the glass rod made of the glass member having the rectangular-column shape. Also, the side surfaces thereof are not limited to four surfaces, provided that they conform to the shape of the image display surface of the display device 13. Accordingly, as the used rod integrator 7, it is possible to employ the hollow tubular member constituted by the combination of the plural reflection mirrors, the glass member having the polygonal column shape and the like.

The illumination light emitted from the rod integrator 7 is passed through the relay optical system 8, then is reflected by the mirror 15 and enters the image display surface of the display device 13. The relay optical system 8 relays the illumination light to cause the emission end surface of the rod integrator 7 to form the image on the image display surface of the display device 13. Namely, on the image display surface of the display device 13, the image of the emission end surface of the rod integrator 7 is formed.

On the image display surface of the display device 13, the two-dimensional image is formed through the modulation of the illumination light. In this case, it is assumed that the display device 13 is the digital micromirror device. However, the used display device 13 is not limited thereto, and it is also possible to employ another reflection type display device (for example, the liquid crystal display device) suitable for the projection system. In the case of employing the digital micromirror device as the display device 13, the light incident thereto is spatially modulated by being reflected by the respective micromirrors being in the ON/OFF states (for example, in the states of being angled by ±12 degrees). At this time, only the light reflected by the micromirrors in the ON state passes through the variable stop mechanism 9 and then enters the projecting lens 14. As a result, the image displayed on the display device 13 is projected onto the screen in the enlarged manner.

The variable stop mechanism 9 provided in the projection system forms the variable stop for dynamically changing the quantity of projected light at a high speed (for example, at a high speed which is indistinguishable by humans), according to the brightness of the image to be displayed on the image display surface of the display device 13. The variable stop restricts the quantity of light, at (or near) the position conjugate with the plural secondary-light-source images generated by the rod integrator 7. Further, the variable stop mechanism 9 operates at a high speed (for example, at every image frame) to open or close the stop based on information on the brightness of the image included in the image signal, thereby changing the brightness and darkness of the projected image. For example, for the dark scene, the quantity of projected light is reduced to express the sharp black color, while, for the bright scene, the quantity of projected light is increased for having the clear screen. This enables increasing the dynamic range according to the scene, thereby enabling expressing the pictures with excellent contrast feeling. Further, the positions of the stops in the projection system and the illumination system are conjugate with each other and, therefore, the effect of the concrete examples 1 to 4 of the variable stop mechanism 9 are similar to that of the case of FIG. 1.

In the present embodiment, the projection light obliquely enters the projecting lens 14. Further, the position of the stop is at the rearmost position (the position closest to the DMD) of the projection lens 14, where the unitized variable stop mechanism 9 is placed. In this configuration, even if the stop blade with high reflectivity and high reliability against heat is employed, the reflected light is not returned toward the display device 13, which prevents occurrence of stray light and ghosts.

In the variable stop mechanism 9, the stop blade is placed movably substantially in a vertical direction. The vertical direction is a direction in which the stop blade intrudes into the display screen of the display device 13 or the incident end surface of the rod integrator 7 from a longer side thereof. In this direction, reflection occurs for a greater number of times in the rod integrator 7 and there are caused a greater number of the secondary-light-source images. Therefore, there is the relatively preferable illuminance distribution in the direction. Accordingly, the aperture setting in this direction is preferable, since the non-uniformity in the illuminance distribution caused midway through the aperture setting is inconspicuous.

Figure 8:
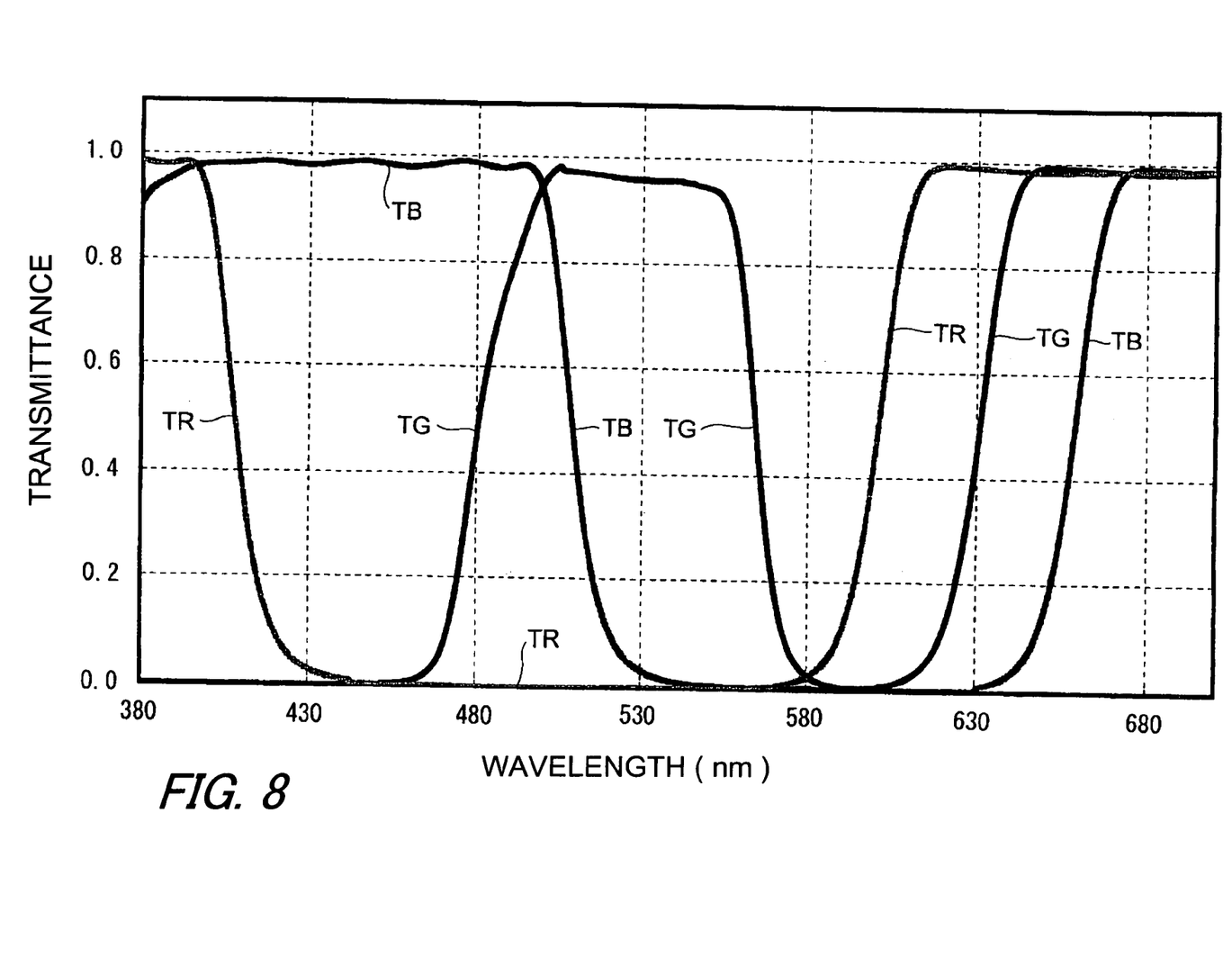
FIG. 8 is a graph illustrating a spectral transmittance of the color wheel.

Next, there will be described a spectral characteristic of the color wheel 6 (FIG. 7) used in the aforementioned embodiment (FIG. 1 and FIG. 6) of the image projecting apparatus. FIG. 8 illustrates the spectral transmittance of the color wheel 6. In FIG. 8, TR represents a curve of the transmittance of the R (red) color filter, TG represents a curve of the transmittance of the G (green) color filter, and TB represents a curve of the transmittance of the B (blue) color filter. The color wheel 6 is constituted by the color filters which transmits therethrough the respective colors R, G and B corresponding to a three primary colors, and this color wheel 6 has the transmittance characteristic in a wavelength region other than the R, G and B wavelength regions to inherently transmitting therethrough, thereby providing the standard chromaticities based on SMPTE (Society of Motion Picture and Television Engineers) 296.

As can be seen from the transmittance curve TR, the R (red) color filter transmits therethrough the wavelength equal to or greater than 600 nm while reflecting the wavelength equal to or less than 600 nm, and further transmits therethrough the wavelength equal to or less than 410 nm. As can be seen from the transmittance curve TG, the G (green) color filter transmits therethrough the wavelength in a range of 480 nm to 560 nm while reflecting other wavelength, and further transmits therethrough the wavelength equal to or greater than 630 nm. As can be seen from the transmittance curve TB, the B (blue) color filter transmits therethrough the wavelength equal to or less than 510 nm while reflecting the wavelength equal to or greater than 510 nm, and further transmits therethrough the wavelength equal to or greater than 660 nm. This can realize chromaticity coordinates for the respective colors: R (x, y)=(0.640, 0.330), G (x, y)=(0.300, 0.600), and B (x, y)=(0.150, 0.060). By causing the wavelength which is not included in an inherent transmittance region to be transmitted, it is possible to obtain a color having a target chromaticity value.

In the case of employing the super-high pressure mercury-vapor lamp or the metal halide lamp as the light source, an emission line having a wavelength of 580 nm is an obstruction in expressing the color and, therefore, there is a need for eliminating it through a yellow cut filter. However, this additionally requires the yellow cut filter, thereby increasing the cost. Further, if the R, G and B color filters are set in such a manner as to avoid the emission line, this will make it impossible to provide a desired chromaticity value with each of the monochrome colors. If the R, G and B color filters are set to have transmission ranges which cover the emission line in order to obtain the desired chromaticity values, this will increase chromaticity variation and brightness variation due to fabrication variation. By causing at least a portion of the color filter constituting the color wheel to have the transmission range other than the transmission ranges of the inherent primary colors, it is possible to provide the desired chromaticity value with the monochrome color, thereby providing the color wheel which is less prone to be affected by a fabrication error.

It is preferable to set a cut-off wavelength (wavelength at which the transmittance is 50%) of the color wheel within a range of a cut-off value which can keep a change in the chromaticity value within ±0.01. For example, it is preferable that the R color filter transmits therethrough the wavelength equal to or greater than 596 to 604 nm while reflecting the wavelength equal to or less than 596 to 604 nm, and further transmits therethrough the wavelength equal to or less than 402 to 414 nm. It is preferable that the G color filter transmits therethrough the wavelength in a range from 477 to 483 nm to 553 to 564 nm while reflecting the wavelength other than the above and further transmits therethrough the wavelength equal to or greater than 626 to 636 nm. Further, it is preferable that the B color filter transmits therethrough the wavelength equal to or less than 505 to 515 nm while reflecting the wavelength equal to or greater than 505 to 515 nm, and further transmits therethrough the wavelength equal to or greater than 647 nm (even if the B color filter does not have a greater-wavelength transmission range, the change in the chromaticity value can be kept equal to or less than 0.01). Further, it is not necessary to employ all the aforementioned color filters, and it is only required to appropriately employ them as required depending on a required permissible chromaticity value. However, it is preferable to employ them in an order of precedence of G, R and B.

In the aforementioned configuration, the change in the quantity of light passing through the variable stop is greater than the change in the size of the effective region of the stop aperture from before to after the aperture setting and, therefore, even if the aperture setting is performed through the variable stop, it is possible to suppress the reduction in the number of the secondary-light-source images passing through the variable stop due to the aperture setting. As a result, it is possible to maintain the uniform illumination effect of the integrator. Further, it is possible to perform the aperture setting through the variable stop in such a manner as to prevent the F number of the projection system from being increased thus to increase the depth of focus, which can prevent the dust and the like adhered to the optical component near the surface conjugate with the screen from being conspicuous on the projection screen. This enables the variable stop to effectively function while maintaining the uniform illumination effect of the integrator. For example, by providing the variable stop mechanism for dynamically changing the quantity of projected light according to the brightness of the image to be displayed on the surface of the display device, it is possible to emphasize the brightness and darkness of the picture scene to be displayed to increase the contrast thereof.

While in the case of using the two stop blades, the stop blades have the sawtooth portions in the aforementioned example, the present invention is not limited thereto. It is possible to use plural stop blades having the ND filters and plural stop blades having the plural apertures.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image projecting apparatus comprising:
an integrator for generating plural secondary-light-source images for generating illumination light with a uniform intensity;
a variable stop mechanism arranged at or near a position conjugate with the secondary-light-source images and having a stop blade configured to move across an optical path from an open-state to a closed-state for changing a quantity of light, the change in the quantity of light passing through said variable stop caused by the movement of said stop blade being greater than a change in a size of an effective region of a stop aperture;
an actuator for moving the stop blade;
an image forming device for modulating the illumination light from the integrator based on an image signal for forming image light; and
a projection optical system for projecting the image light from the image forming device in an enlarged manner.

2. The image projecting apparatus according to claim 1, wherein said stop blade has an ND filter.

3. The image projecting apparatus according to claim 2, wherein the ND filter has transmittances varying depending on a position thereon.

4. The image projecting apparatus according to claim 3, wherein the ND filter has transmittances varying continuously depending on the position thereon.

5. The image projecting apparatus according to claim 2, wherein the ND filter is made of a heat-resistant glass.

6. The image projecting apparatus according to claim 2, wherein the ND filter is made of sapphire.

7. The image projecting apparatus according to claim 2, wherein the variable stop mechanism is arranged between the integrator and the image forming device, and the ND filter is of a coating type.

8. The image projecting apparatus according to claim 2, wherein the variable stop mechanism is arranged in the projection optical system, and the ND filter is of an absorption type.

9. The image projecting apparatus according to claim 2, wherein the variable stop mechanism is arranged between the projection optical system and the image forming device, and the ND filter is of a coating type.

10. The image projecting apparatus according to claim 2, further comprising:
    a memory for storing data defining a relationship between the quantity of light passing through the variable stop and a position at which the stop blade stays; and
    a control unit for controlling the position at which the stop blade stays based on the image signal and the data from the memory.

11. The image projecting apparatus according to claim 1, wherein the stop blade has plural apertures therethrough for passing light from the secondary-light-source images.

12. The image projecting apparatus according to claim 11, wherein a size of the apertures is smaller than the light-source images.

13. The image projecting apparatus according to claim 11, wherein a size of the apertures through the stop blade is varied across the stop blade and, therefore, the quantity of light is varied depending on a position of the stop blade.

14. The image projecting apparatus according to claim 11, further comprising:
    a memory for storing data defining a relationship between the quantity of light passing through the variable stop and a position at which the stop blade stays; and
    a control unit for controlling the position at which the stop blade stays based on the image signal and the data from the memory.

15. The image projecting apparatus according to claim 1, wherein the variable stop mechanism includes at least two stop blades which move across the optical path for changing the quantity of light, and each of the stop blades has a sawtooth portion.

16. The image projecting apparatus according to claim 15, wherein the stop blades intercept light passing through the stop aperture in a symmetric manner.

17. The image projecting apparatus according to claim 15, wherein the variable stop mechanism includes, for each single stop blade, a single actuator and a single sensor for detecting a position of the respective stop blade.

18. The image projecting apparatus according to claim 1, further comprising two light sources, wherein
    the variable stop mechanism includes two stop blades, and
    the stop blades intercept light passing through the stop aperture in a symmetric manner with a symmetry axis sandwiched therebetween, the symmetry axis being in a direction of an arrangement of the light-source images from the two light sources.

19. An image projecting apparatus comprising:
    an integrator for generating plural secondary-light-source images for generating illumination light with a uniform intensity;
    a variable stop mechanism located at a position on an optical path of the image projecting apparatus, the variable stop mechanism including a stop blade having plural apertures of sizes smaller than a size of the secondary-light-source images therethrough, wherein the stop blade is configured to move across the optical path from an open-state to a closed-state to change a quantity of light passing through the variable stop mechanism;
    an actuator for moving the stop blade;
    an image forming device for modulating the illumination light from the integrator based on an image signal for forming image light; and
    a projection optical system for projecting the image light from the image forming device in an enlarged manner.

20. An image projecting apparatus comprising:
    an integrator for generating plural secondary-light-source images for generating illumination light with a uniform intensity;
    a variable stop mechanism located at a position on an optical path of the image projecting apparatus, the variable stop mechanism including at least two stop blades, each having a respective sawtooth portion, wherein the stop blades are adapted to move across the optical path for changing a quantity of light passing through the variable stop mechanism;
    an actuator for moving the stop blades;
    an image forming device for modulating the illumination light from the integrator based on an image signal for forming image light; and
    a projection optical system for projecting the image light from the image forming device in an enlarged manner.

21. The image projecting apparatus according to claim 20, wherein at least one tooth of the respective sawtooth portions of the stop blades has a height different from at least one other tooth of the respective sawtooth portions of the stop blades.

* * * * *

UNITED STATES PATENT AND TRADEMARK OFFICE
CERTIFICATE OF CORRECTION

PATENT NO. : 7,784,950 B2 Page 1 of 1
APPLICATION NO. : 11/517100
DATED : August 31, 2010
INVENTOR(S) : Yasumasa Sawai It is certified that error appears in the above-identified patent and that said Letters Patent is hereby corrected as shown below:

Column 13:
Line 6, delete "supper-high" and insert -- super-high --.

Signed and Sealed this

Seventh Day of December, 2010

David J. Kappos
*Director of the United States Patent and Trademark Office*